(12) United States Patent
Stevenson

(10) Patent No.: US 9,760,205 B2
(45) Date of Patent: *Sep. 12, 2017

(54) INTERFERENCE MITIGATION IN A CAPACITIVE SENSING DEVICE

(71) Applicant: Synaptics Incorporated, San Jose, CA (US)

(72) Inventor: Matthew Stevenson, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 14/701,468

(22) Filed: Apr. 30, 2015

(65) Prior Publication Data

US 2016/0320896 A1 Nov. 3, 2016

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0418* (2013.01); *G06F 2203/04107* (2013.01)

(58) Field of Classification Search
CPC ...................................................... G06F 3/044
See application file for complete search history.

(56) References Cited

U.S. PATENT DOCUMENTS

| 7,643,011 | B2 * | 1/2010 | O'Connor ............. G06F 3/0418 345/156 |
| 8,982,091 | B1 * | 3/2015 | Mohindra ............... G06F 3/044 345/173 |
| 9,372,581 | B2 * | 6/2016 | Cattivelli |
| 2008/0157893 | A1 | 7/2008 | Krah |
| 2008/0309625 | A1 | 12/2008 | Krah et al. |
| 2008/0309628 | A1 | 12/2008 | Krah et al. |
| 2011/0061948 | A1 | 3/2011 | Krah et al. |
| 2011/0115729 | A1 * | 5/2011 | Kremin ................. G06F 3/0418 345/173 |
| 2011/0210939 | A1 | 9/2011 | Reynolds et al. |
| 2012/0013565 | A1 * | 1/2012 | Westhues .............. G06F 3/0418 345/174 |
| 2012/0018229 | A1 | 1/2012 | Leuchtenberg et al. |
| 2012/0217978 | A1 | 8/2012 | Shen et al. |
| 2012/0249476 | A1 * | 10/2012 | Schwartz ................ G06F 3/044 345/174 |

* cited by examiner

*Primary Examiner* — Patrick Edouard
*Assistant Examiner* — Maheen Javed
(74) *Attorney, Agent, or Firm* — Patterson + Sheridan, LLP

(57) ABSTRACT

In an example, a processing system for a capacitive sensing device includes a sensor module having sensor circuitry coupled to a first plurality of sensor electrodes. The sensor module is configured to receive resulting signals from the plurality of sensor electrodes using a capacitive sensing signal having a plurality of capacitive sensing bursts and a sensing frequency. The sensor module is further configured to introduce at least one phase shift between a respective at least one pair of the plurality of capacitive sensing bursts. The processing system further includes a determination module configured to determine capacitive measurements based on the resulting signals.

19 Claims, 5 Drawing Sheets

INTERFERENCE MITIGATION IN A CAPACITIVE SENSING DEVICE

BACKGROUND

Field of the Disclosure

Embodiments of disclosure generally relate to capacitive sensing and, more particularly, to interference mitigation in a capacitive sensing device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Techniques for mitigating interference in a capacitive sensing device are described. In an embodiment, a processing system for a capacitive sensing device includes a sensor module having sensor circuitry coupled to a first plurality of sensor electrodes. The sensor module is configured to receive resulting signals from the plurality of sensor electrodes using a capacitive sensing signal having a plurality of capacitive sensing bursts and a sensing frequency. The sensor module is further configured to introduce at least one phase shift between a respective at least one pair of the plurality of capacitive sensing bursts. The processing system further includes a determination module configured to determine capacitive measurements based on the resulting signals.

In another embodiment, a method of operating a capacitive sensing device having a plurality of sensor electrodes includes receiving resulting signals from the plurality of sensor electrodes using a capacitive sensing signal having a plurality of capacitive sensing bursts and a sensing frequency. The method further includes introducing at least one phase shift between a respective at least one pair of the plurality of capacitive sensing bursts. The method further includes determining capacitive measurements based on the resulting signals.

In another embodiment, an input device includes a plurality of sensor electrodes and a processing system coupled to the plurality of sensor electrodes. The processing system is configured to receive resulting signals from the plurality of sensor electrodes using a capacitive sensing signal having a plurality of capacitive sensing bursts and a sensing frequency. The processing system is further configured to introduce at least one phase shift between a respective at least one pair of the plurality of capacitive sensing bursts. The processing system is further configured to determine capacitive measurements based on the resulting signals.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
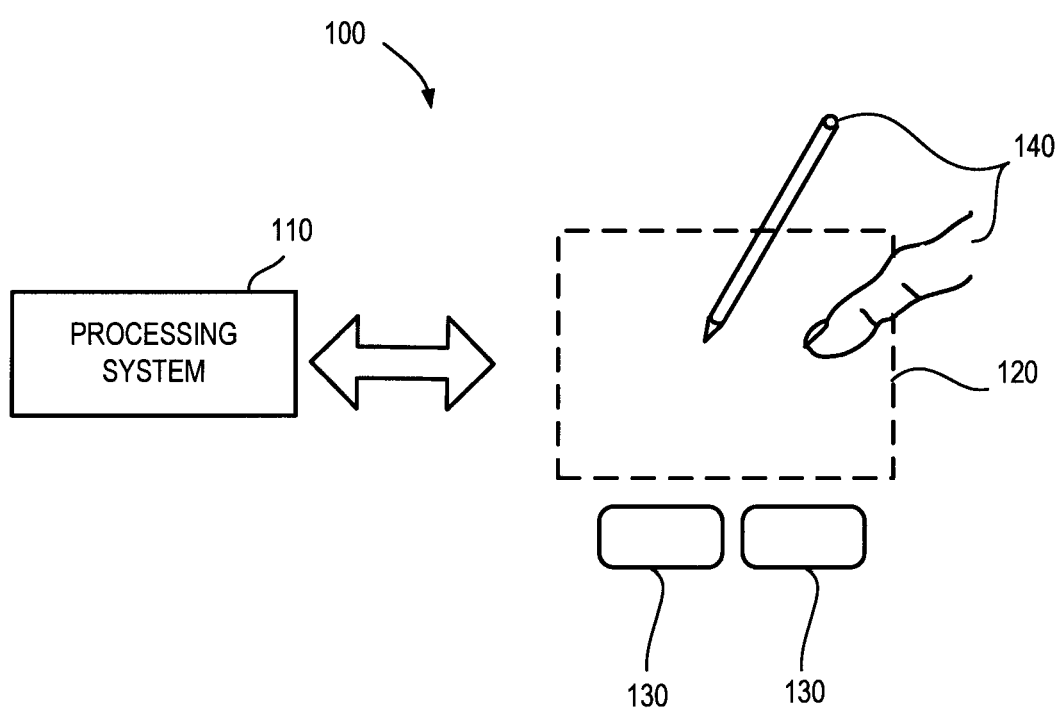
FIG. 1 is a block diagram of an exemplary input device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
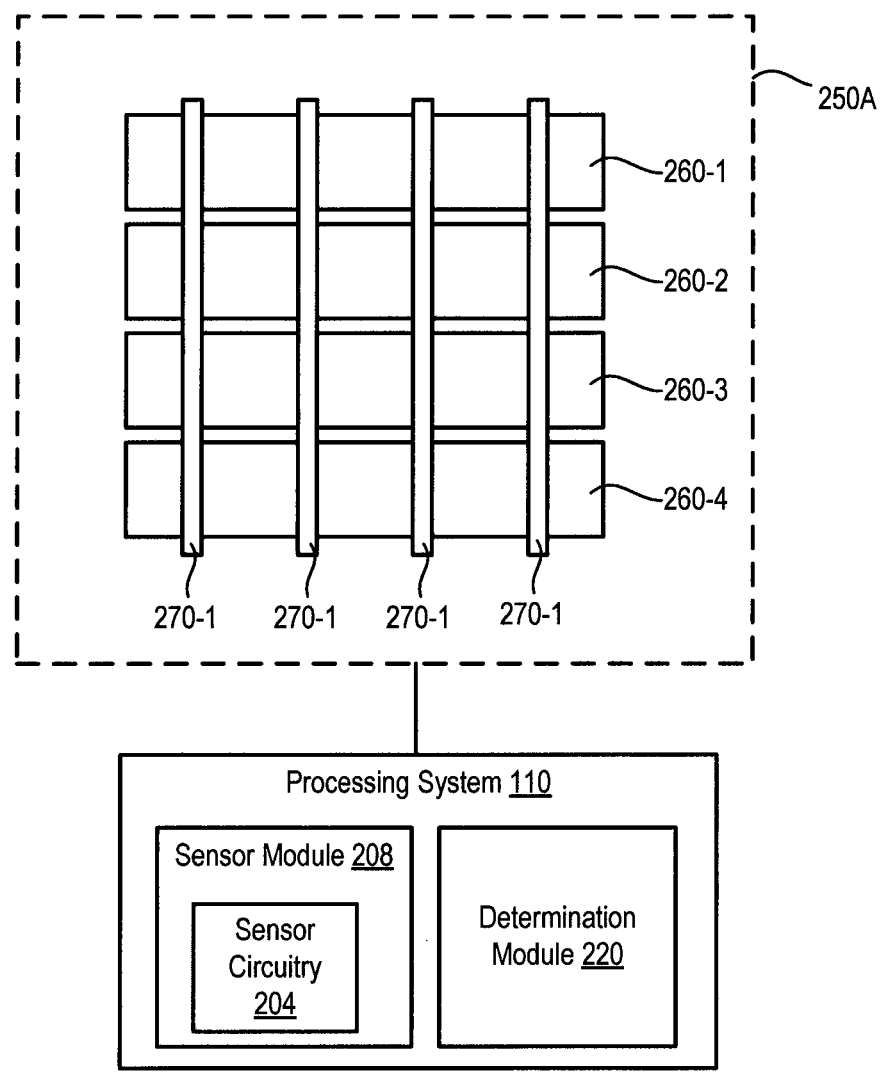
FIGS. 2A-2B illustrate portions of exemplary patterns of sensing elements according to embodiments described herein.

FIG. 2A illustrates a portion of an exemplary pattern of sensing elements according to some embodiments. For clarity of illustration and description, FIG. 2A shows the sensing elements in a pattern of simple rectangles and does not show various components, such as various interconnects between the sensing elements and the processing system 110. An electrode pattern 250A comprises a first plurality of sensor electrodes 260 (260-1, 260-2, 260-3, . . . 260-$n$), and a second plurality of sensor electrodes 270 (270-1, 270-2, 270-3, . . . 270-$m$) disposed over the first plurality of electrodes 260. In the example shown, n=m=4, but in general n and m are each positive integers and not necessarily equal to each other. In various embodiments, the first plurality of sensor electrodes 260 are operated as a plurality of transmitter electrodes (referred to specifically as "transmitter electrodes 260"), and the second plurality of sensor electrodes 270 are operated as a plurality of receiver electrodes (referred to specifically as "receiver electrodes 270"). In another embodiment, one plurality of sensor electrodes may be configured to transmit and receive and the other plurality of sensor electrodes may also be configured to transmit and receive. Further processing system 110 receives resulting signals with one or more sensor electrodes of the first and/or second plurality of sensor electrodes while the one or more sensor electrodes are modulated with absolute capacitive sensing signals. The first plurality of sensor electrodes 260, the second plurality of sensor electrodes 270, or both can be disposed within the sensing region 120. The electrode pattern 250A can be coupled to the processing system 110.

The first plurality of electrodes 260 and the second plurality of electrodes 270 are typically ohmically isolated from each other. That is, one or more insulators separate the first plurality of electrodes 260 and the second plurality of electrodes 270 and prevent them from electrically shorting to each other. In some embodiments, the first plurality of electrodes 260 and the second plurality of electrodes 270 are separated by insulative material disposed between them at cross-over areas; in such constructions, the first plurality of electrodes 260 and/or the second plurality of electrodes 270 can be formed with jumpers connecting different portions of the same electrode. In some embodiments, the first plurality of electrodes 260 and the second plurality of electrodes 270 are separated by one or more layers of insulative material. In such embodiments, the first plurality of electrodes 260 and the second plurality of electrodes 270 can be disposed on separate layers of a common substrate. In some other embodiments, the first plurality of electrodes 260 and the second plurality of electrodes 270 are separated by one or more substrates; for example, the first plurality of electrodes 260 and the second plurality of electrodes 270 can be disposed on opposite sides of the same substrate, or on different substrates that are laminated together. In some embodiments, the first plurality of electrodes 260 and the second plurality of electrodes 270 can be disposed on the same side of a single substrate.

The areas of localized capacitive coupling between the first plurality of sensor electrodes 260 and the second plurality sensor electrodes 270 may be form "capacitive pixels" of a "capacitive image." The capacitive coupling between sensor electrodes of the first and second pluralities 260 and 270 changes with the proximity and motion of input objects in the sensing region 120. Further, in various embodiments, the localized capacitive coupling between each of the first plurality of sensor electrodes 260 and the second plurality of sensor electrodes 270 and an input object may be termed "capacitive pixels" of a "capacitive image." In some embodiments, the localized capacitive coupling between each of the first plurality of sensor electrodes 260 and the second plurality of sensor electrodes 270 and an input object may be termed "capacitive measurements" of "capacitive profiles."

The processing system 110 can include a sensor module 208 having sensor circuitry 204. The sensor module 208 operates the electrode pattern 250A receive resulting signals from electrodes in the electrode pattern using a capacitive sensing signal having a sensing frequency. The processing system 110 can include a determination module 220 configured to determine capacitive measurements from the resulting signals. The determination module 220 can track changes in capacitive measurements to detect input object(s) in the sensing region 120. The processing system 110 can include other modular configurations, and the functions performed by the sensor module 208 and the determination module 220 can, in general, be performed by one or more modules in the processing system 110. The processing system 110 can include modules, and can perform other functions as described in some embodiments below.

The processing system 110 can operate in absolute capacitive sensing mode or transcapacitive sensing mode. In absolute capacitive sensing mode, receiver(s) in the sensor circuitry 204 measure voltage, current, or charge on sensor electrode(s) in the electrode pattern 250A while the sensor electrode(s) are modulated with absolute capacitive sensing signals to generate the resulting signals. The determination module 220 generates absolute capacitive measurements from the resulting signals. The determination module 220 can track changes in absolute capacitive measurements to detect input object(s) in the sensing region 120.

In transcapacitive sensing mode, transmitter(s) in the sensor circuitry 204 drive one or more of the first plurality of electrodes 260 with the capacitive sensing signal (also referred to as a transmitter signal or modulated signal in the transcapacitive sensing mode). Receiver(s) in the sensor circuitry 204 measure voltage, current, or charge on one or more of the second plurality of electrodes 270 to generate the resulting signals. The resulting signals comprise the effects of the capacitive sensing signal and input object(s) in the sensing region 120. The determination module 220 generates transcapacitive measurements from the resulting signals. The determination module 220 can track changes in transcapacitive measurements to detect input object(s) in the sensing region 120.

In some embodiments, the processing system 110 "scans" the electrode pattern 250A to determine capacitive measurements. In the transcapacitive sensing mode, the processing system 110 can drive the first plurality of electrodes 260 to transmit transmitter signal(s). The processing system 110 can operate the first plurality of electrodes 260 such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of electrodes 270 to be independently determined. In the absolute capacitive sensing mode, the processing system 110 can receiving resulting signals from one sensor electrode 260, 270 at a time, or from a plurality of sensor electrodes 260, 270 at a time. In either mode, the processing system 110 can operate the second plurality of electrodes 270 singly or collectively to acquire resulting signals. In absolute capacitive sensing mode, the processing system 110 can concurrently drive all electrodes along one or more axes. In some examples, the processing system 110 can drive electrodes along one axis (e.g., along the first plurality of sensor electrodes 260) while electrodes along another axis are driven with a shield signal, guard signal, or the like. In some examples, some electrodes along one axis and some electrodes along the other axis can be driven concurrently.

In the transcapacitive sensing mode, the processing system 110 can use the resulting signals to determine capacitive measurements at the capacitive pixels. A set of measurements from the capacitive pixels form a "capacitive image" (also "capacitive frame") representative of the capacitive measurements at the pixels. The processing system 110 can acquire multiple capacitive images over multiple time periods, and can determine differences between capacitive images to derive information about input in the sensing region 120. For example, the processing system 110 can use successive capacitive images acquired over successive periods of time to track the motion(s) of one or more input objects entering, exiting, and within the sensing region 120.

In absolute capacitive sensing mode, the processing system 110 can use the resulting signals to determine capacitive measurements along an axis of the sensor electrodes 260 and/or an axis of the sensor electrodes 270. A set of such measurements forms a "capacitive profile" representative of the capacitive measurements along the axis. The processing system 110 can acquire multiple capacitive profiles along one or both of the axes over multiple time periods and can determine differences between capacitive profiles to derive information about input in the sensing region 120. For example, the processing system 110 can use successive capacitive profiles acquired over successive periods of time to track location or proximity of input objects within the sensing region 120. In other embodiments, each sensor can be a capacitive pixel of a capacitive image and the absolute capacitive sensing mode can be used to generate capacitive image(s) in addition to or in place of capacitive profiles.

The baseline capacitance of the input device 100 is the capacitive image or capacitive profile associated with no input object in the sensing region 120. The baseline capacitance changes with the environment and operating conditions, and the processing system 110 can estimate the baseline capacitance in various ways. For example, in some embodiments, the processing system 110 takes "baseline images" or "baseline profiles" when no input object is determined to be in the sensing region 120, and uses those baseline images or baseline profiles as estimates of baseline capacitances. The determination module 220 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In some touch screen embodiments, at least one of the first plurality of sensor electrodes 260 and the second plurality of sensor electrodes 270 comprise one or more display electrodes of a display device used in updating a display of a display screen, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. The display electrodes can also be referred to as "combination electrodes," since the display electrodes perform functions of display updating and capacitive sensing. In various embodiments, each sensor electrode of the first and second plurality of sensor electrodes 260 and 270 comprises one or more combination electrodes. In other embodiments, at least two sensor electrodes of the first plurality of sensor electrodes 260 or at least two sensor electrodes of the second plurality of sensor electrodes 270 may share at least one combination electrode. Furthermore, in one embodiment, both the first plurality of sensor electrodes 260 and the second plurality electrodes 270 are disposed within a display stack on the display screen substrate. Additionally, at least one of the sensor electrodes 260, 270 in the display stack may comprise a combination electrode. However, in other embodiments, only the first plurality of sensor electrodes 260 or the second plurality of sensor electrodes 270 (but not both) are disposed within the display stack, while other sensor electrodes are outside of the display stack (e.g., disposed on an opposite side of a color filter glass).

In an embodiment, the processing system 110 comprises a single integrated controller, such as an application specific integrated circuit (ASIC), having the sensor module 208, the determination module 220, and any other module(s). In another embodiment, the processing system 110 can include a plurality of integrated circuits, where the sensor module 208, the determination module 220, and any other module(s) can be divided among the integrated circuits. For example, the sensor module 208 can be on one integrated circuit, and the determination module 220 and any other module(s) can be one or more other integrated circuits. In some embodiments, a first portion of the sensor module 208 can be on one integrated circuit and a second portion of the sensor module 208 can be on second integrated circuit. In such embodiments, at least one of the first and second integrated circuits comprises at least portions of other modules such as a display driver module and/or a display driver module.

Figure 2B:
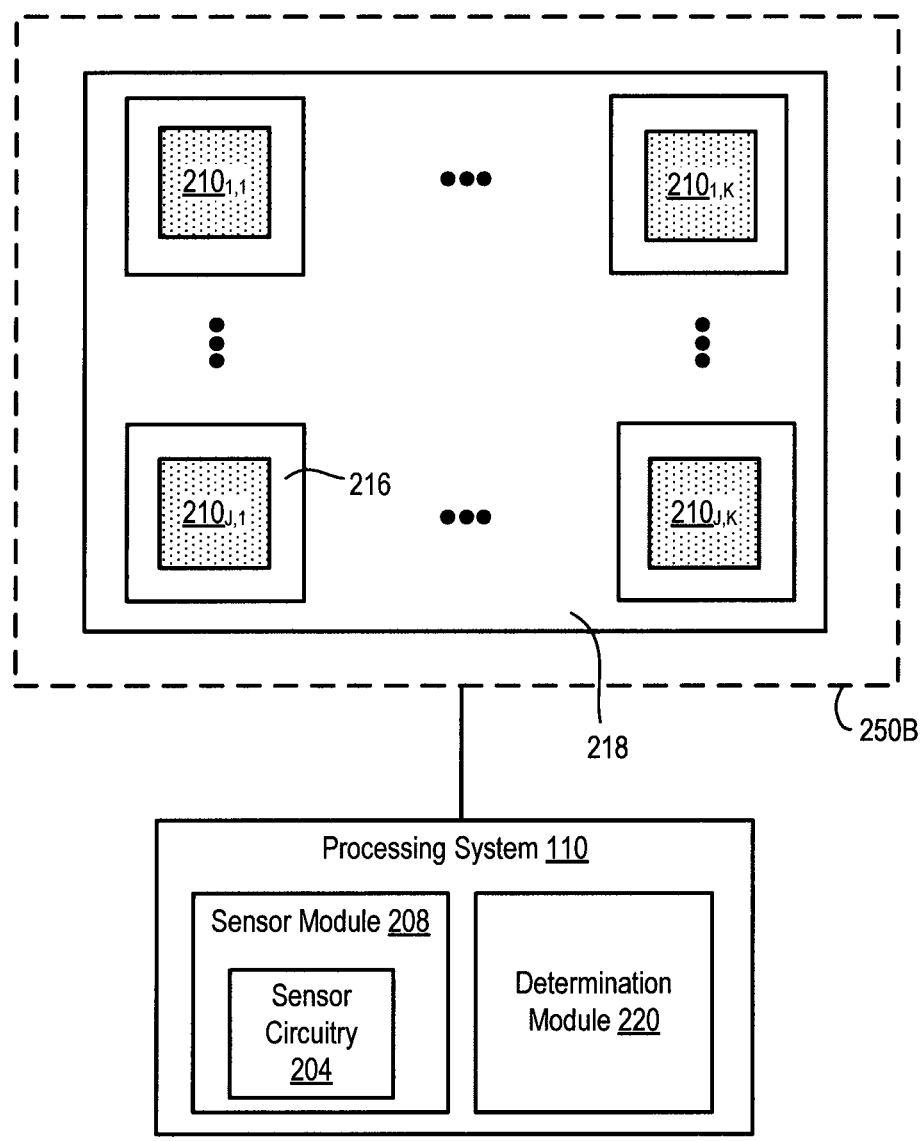

FIG. 2B illustrates a portion of another exemplary pattern of sensing elements according to some embodiments. For clarity of illustration and description, FIG. 2B presents the sensing elements in a matrix of rectangles and does not show various components, such as various interconnects between the processing system 110 and the sensing elements. An electrode pattern 250B comprises a plurality of sensor electrodes 210 disposed in a rectangular matrix. The electrode pattern 250B comprises sensor electrodes $210_{J,K}$ (referred to collectively as sensor electrodes 210) arranged in J rows and K columns, where J and K are positive integers, although one or J and K may be zero. It is contemplated that the electrode pattern 250B may comprise other patterns of the sensor electrodes 210, such as polar arrays, repeating patterns, non-repeating patterns, non-uniform arrays a single row or column, or other suitable arrangement. Further, the sensor electrodes 210 may be any shape, such as circular, rectangular, diamond, star, square, noncovex, convex, non-concave concave, etc. Further, the sensor electrodes 210 may be sub-divided into a plurality of distinct sub-electrodes. The electrode pattern 250 is coupled to the processing system 110.

The sensor electrodes 210 are typically ohmically isolated from one another. Additionally, where a sensor electrode 210 includes multiple sub-electrodes, the sub-electrodes may be ohmically isolated from each other. Furthermore, in one embodiment, the sensor electrodes 210 may be ohmically isolated from a grid electrode 218 that is between the sensor electrodes 210. In one example, the grid electrode 218 may surround one or more of the sensor electrodes 210, which are disposed in windows 216 of the grid electrode 218. The grid electrode 218 may be used as a shield or to carry a guarding signal for use when performing capacitive sensing with the sensor electrodes 210. Alternatively or additionally, the grid electrode 218 may be used as sensor electrode when performing capacitive sensing. Furthermore, the grid electrode 218 may be co-planar with the sensor electrodes 210, but this is not a requirement. For instance, the grid electrode 218 may be located on a different substrate or on a different side of the same substrate as the sensor electrodes 210. The grid electrode 218 is optional and in some embodiments, the grid electrode 218 is not present.

In a first mode of operation, the processing system 110 can use at least one sensor electrode 210 to detect the presence of an input object via absolute capacitive sensing. The sensor module 208 can measure voltage, charge, or current on sensor electrode(s) 210 to obtain resulting signals indicative of a capacitance between the sensor electrode(s) 210 and an input object. The determination module 222 uses the resulting signals to determine absolute capacitive measurements. When the electrode pattern 250B, the absolute capacitive measurements can be used to form capacitive images.

In a second mode of operation, the processing system 110 can use groups of the sensor electrodes 210 to detect presence of an input object via transcapacitive sensing. The sensor module 208 can drive at least one of the sensor electrodes 210 with a transmitter signal, and can receive a resulting signal from at least one other of the sensor electrodes 210. The determination module 222 uses the resulting signals to determine transcapacitive measurements and form capacitive images.

The input device 100 may be configured to operate in any one of the modes described above. The input device 100 may also be configured to switch between any two or more of the modes described above. The processing system 110 can be configured as described above with respect to FIG. 2A.

Figure 3:
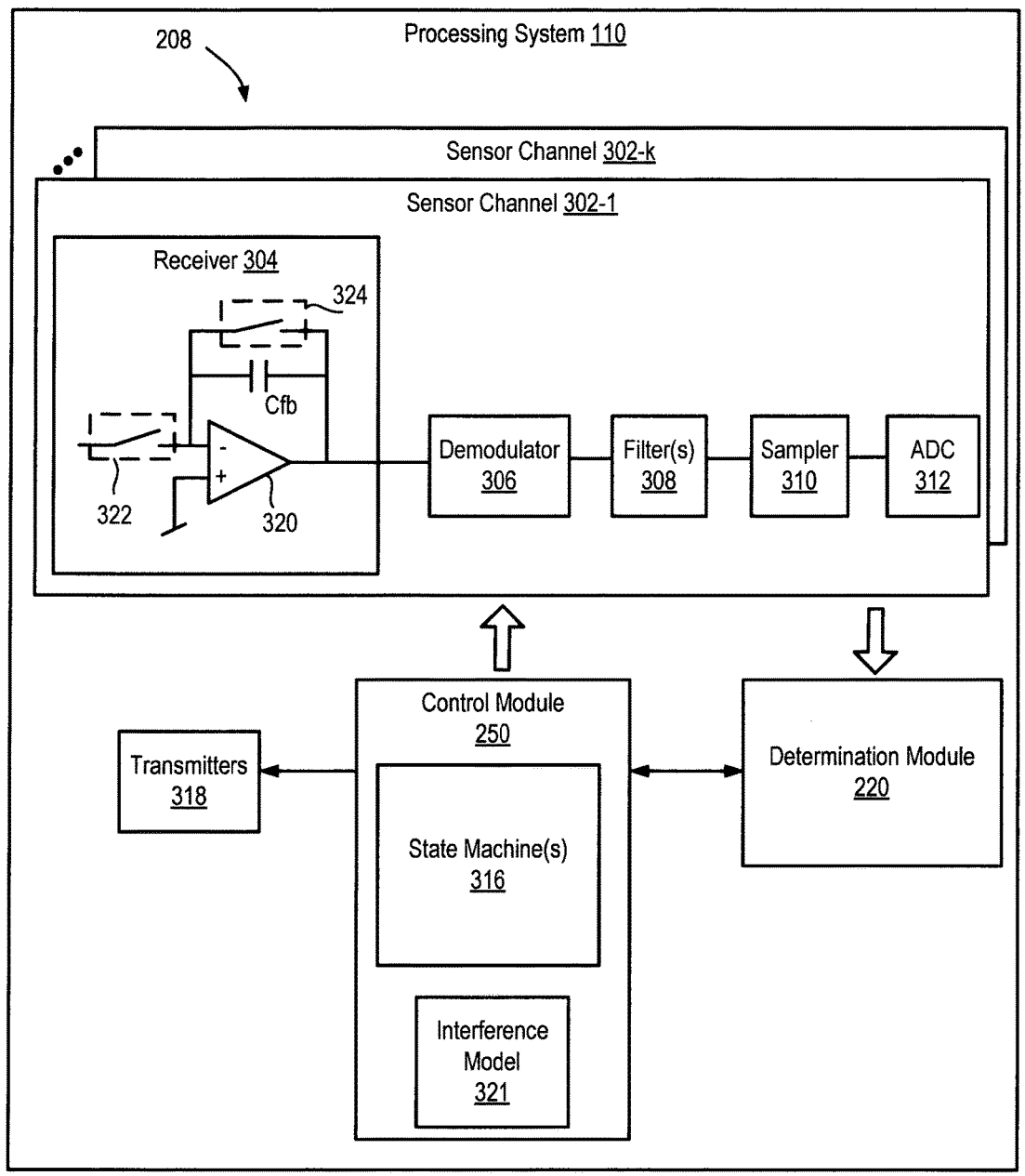
FIG. 3 is a block diagram depicting a more detailed view of the processing system according to an embodiment.

FIG. 3 is a block diagram depicting a more detailed view of the processing system 110 according to an embodiment. The processing system 110 includes the sensor module 208, a control module 250, and the determination module 220. The sensor module 208 includes sensor channels 302-1 through 302-k, where k is positive integer (collectively referred to as "sensor channels 302"). In an embodiment, the sensor module 208 can also include transmitters 318. In another embodiment, the transmitters 318 can be external to the processing system 110. For example, the transmitters 318 can be part of a display controller.

In an embodiment, each of the sensor channels 302 includes a receiver 304, a demodulator 306, filter(s) 308, a sampler 310, and an analog-to-digital converter (ADC) 312. The receiver 304 includes, for example, a sensor switch 322, an integrating amplifier 320, a feedback capacitance Cfb, and a reset switch 324. The feedback capacitance Cfb can include one or more capacitors. The reset switch 324 can include one or more switches that couple respective one or more feedback capacitors to one or more voltages. In other examples, the sensor switch 322 can be omitted or some other high-impedance connection can be used in place of the sensor switch 322. In other examples, a resistor can be used in place of the reset switch 324. Thus, other configurations of the receiver 304 can be used in the sensor channels 302 and embodiments described herein are not limited to any particular receiver architecture. In other embodiments, the sensor channels 302 can have a different architecture than that shown in FIG. 3. For example, another implementation includes a receiver coupled directly to an ADC, where demodulation and filtering are performed in the digital domain rather than in the analog domain. Thus, the embodiments described herein are not limited to any particular architecture of the sensor channels 302.

The sensor channels 302 are coupled to sensor electrodes (e.g., sensor electrodes in the electrode pattern 250A or 250B). The receiver 304 in each of the sensor channels 302 receives a resulting signal from a sensor electrode. The sensor switch 322 controls whether the resulting signal is coupled to an inverting input of the integrating amplifier 320. In transcapacitive sensing, a reference voltage is coupled to a non-inverting input of the integrating amplifier 320. In absolute sensing, a modulated signal is coupled to the non-inverting input of the integrating amplifier 320. The feedback capacitance Cfb and the reset switch 324 are coupled between the output and the inverting input of the integrating amplifier 320. When the sensor switch 322 is closed, the integrating amplifier 320 integrates the resulting signal. The feedback capacitance Cfb accumulates charge. The reset switch 324 can be closed to drain the accumulated charge from the feedback capacitance Cfb. The receiver 304 can accumulate charge and then reset one or more times to implement a sensing cycle. The demodulator 306 samples the output voltage of the integrating amplifier 320 for each accumulated charge to obtain resulting signal measurement(s) for each sensing cycle.

The demodulator 306 mixes a signal having a sensing frequency with the resulting signal measurements from the receiver 304 to translate the resulting signal measurements to baseband (e.g., remove a carrier signal from the resulting signal measurements). The resulting signal measurements are then filtered by the filter(s) 308. The filter(s) 308 can include, for example, a low-pass filter to remove high-frequency noise from the resulting signal measurements. The sampler 310 receives the resulting signal measurements from the filter(s) 308. The sampler 310 combines resulting signal measurements over a plurality of sensing cycles referred to as an "acquisition burst" or "capacitive sensing burst". The ADC 312 generates digital samples of combined measures for each acquisition burst, which are output to the determination module 260. The determination module 260 processes the digital samples for each capacitive sensing burst to derive information, such as capacitive measurements.

In an embodiment, the control module 250 controls each of the sensor channels 302 using state machine(s) 316. The state machine(s) 316 can include various state machines, such as a sensing state machine to control the transmitters 318, the receivers 304, and the sampling by the demodulators 306; a filter state machine to control the demodulators 306, the filters 308, and the samplers 310; and an ADC state machine to control the ADCs 312. Other configurations of state machines can be used, or the control module 250 can implement the control functions described herein using another mechanism. While the control module 250 is shown as a separate module, the functions of the control module 250 can be performed by the sensor module 208, the determination module 220, or a combination thereof. Alternatively, the functions of the control module 250 can be divided among a plurality of separate modules.

For transcapacitive sensing, the control module 250 controls the transmitters 318 to drive transmitter electrodes with a transmitter signal having a plurality of capacitive sensing bursts and a sensing frequency. The control module 250 controls the receivers 304 in the sensor channels 302 to receive resulting signals from receiver electrodes. The control module 250 controls the determination module 220 to determine transcapacitive measurements and capacitive frame(s) from resulting signal measurements generated over one or more capacitive sensing bursts by each of the sensor channels 302.

For absolute sensing, the control module 250 controls the receivers 304 in the sensor channels 302 to receive resulting signals from sensor electrodes using a capacitive sensing signal having a plurality of capacitive sensing bursts and a sensing frequency. The control module 250 controls the determination module 220 to determine absolute capacitive measurements and capacitive frames (capacitive images or profiles) from resulting signal measurements generated over one or more capacitive sensing bursts by each of the sensor channels 302.

The presence of high-amplitude interference coupled to the sensor electrodes can attenuate resulting signal measurements, causing a reduction in the magnitude of capacitive measurements. High-amplitude interference can sometimes cause the magnitude of the capacitive measurements to be negative (e.g., less than the baseline). In addition, certain interference frequencies can beat against the sensing frequency and capacitive burst length and appear at baseband at the output of the demodulator 306. The presence of such baseband interference can also reduce the magnitude of capacitive measurements, even causing negative values. The reduced or negative capacitive measurements can cause the processing system 110 to fail to detect input object(s) in the sensing region 120.

The processing system 110 can operate to mitigate interference in the resulting signal measurements. The resulting signal measurements can be obtained using absolute capacitive sensing or transcapacitive sensing. The resulting signal measurements can be obtained from different electrode patterns, such as the electrode pattern 250A or the electrode pattern 250B. The resulting signal measurements can be used to generate different types of capacitive measurements, such as absolute capacitive measurements or transcapacitive measurements. The capacitive measurements can be used to produce capacitive images (frames) or capacitive profiles. Capacitive profiles can be obtained along one or more axes defined by the electrode pattern.

In an embodiment, the control module 250 introduces at least one phase shift between pair(s) of the capacitive sensing bursts. The control module 250 can include an interference model 321 that specifies the magnitude(s) of the phase shift(s). In an embodiment, the control module 250 always operates to mitigate interface. In another embodiment, the control module 250 selectively operates to mitigate interference. For example, the control module 250 can communicate with the determination module 220 to identify capacitive measurements that satisfy a threshold indicating the presence of interference. The control module 250 can then invoke interference mitigation. In another embodiment, the determination module 220 can identify an interference condition and direct the control module 250 to invoke interference mitigation. In yet another embodiment, the sensor module 208 can detect resulting signal measurements satisfy a threshold and direct the control module 250 to invoke interference mitigation.

In an embodiment, the control module 250 introduces at least one phase shift between a respective at least one pair of the plurality of capacitive sensing bursts. For example, the control module 250 can trigger measurements over a sequence of at least three capacitive sensing bursts. In some examples, a phase shift can be inserted between each pair of the capacitive sensing bursts. In other examples, phase shift(s) can be inserted between some pair(s) of the capacitive sensing bursts, while no phase shift(s) are inserted between other pair(s) of the capacitive sensing bursts. The control module 250 can determine both the number of capacitive sensing bursts and between which capacitive sensing bursts phase shift(s) are inserted. In an embodiment, the control module 250 can dynamically change the number of capacitive sensing burst and/or the location of the phase shift(s) based on detected interference.

The control module 250 can determine the values for the phase shift(s) between capacitive sensing bursts from the interference model 321. The interference model 321 can be pre-determined through simulation and/or experiment. In another embodiment, the interference model 312 can be updated dynamically during operation. In an embodiment, the noise acquisition model 321 can include phase shift value for each of a plurality of numbers of capacitive sensing bursts in a sequence (e.g., a phase shift for two bursts, another phase shift for three bursts, another phase shift for four bursts, etc.). For a given number of capacitive sensing bursts, a phase shift can be determined by constructing an analytical metric quantifying the variance of the capacitive measurements versus interference frequency. The analytical metric can then be minimized to find those phase shifts that result in the most constant variance of the capacitive measurements versus interference frequency. In some cases, a given phase shift can be less than a period of the sensing frequency. In other cases, a given phase shift can be greater than a period of the sensing frequency.

The control module 250 can implement the phase shift(s) using different techniques. In an embodiment, the control module 250 implements the phase shift(s) by inserting time delay(s) between pair(s) of the capacitive sensing bursts. A time delay is some real number of time units other than zero. In another embodiment, the control module 250 implements the phase shift(s) by modulating polarity of pair(s) of the capacitive sensing bursts.

The acquisition of capacitive measurements is improved by introducing phase shift(s) between pair(s) of capacitive sensing bursts in the sequence. By adding phase shift(s) between pair(s) of the capacitive sensing bursts, the processing system 110 can prevent interference from being aliased to baseband and thus increases the robustness of the capacitive measurements in the presence of such interference.

In some examples, the control module 250 implements interference mitigation using at least three capacitive sensing bursts. A lower number of capacitive sensing bursts reduces the duration of the capacitive sensing operation, which can allow for increases capacitive frame rate (i.e., less time between capacitive frames), or allow for longer acquisition burst lengths and/or integration durations during capacitive sensing.

In some embodiments, the control module 250 can combine the introduction of phase shift(s) with one or more other interference mitigation techniques. For example, the control module 250 can change the sensing frequency in response to detection of interference. In another example, the control module 250 can configure the sensor channels 302 to operate in a high-noise mode in response to the detection of interference. In a high-noise mode, the sensing cycle can be lengthened (i.e., longer integration of the resulting signals), the length of the acquisition bursts can be increased (i.e., each measurement is combined from more sensing cycles), and/or the determination module 220 can invoke one or more noise mitigation algorithms on the measurements. In another example, the control module 250 can trigger a frequency scan to identify a new sensing frequency in response to interference. These or other known interference mitigation techniques can be employed in combination with the phase shift(s).

As described above, in some embodiments, the control module 250 is omitted and its functions distributed among other modules, such as the sensor module 208 and the determination module 220. Thus, the state machines 316 and the noise acquisition model 321 can be included in the sensor module 208, the determination module 220, or a combination thereof.

Figure 4:
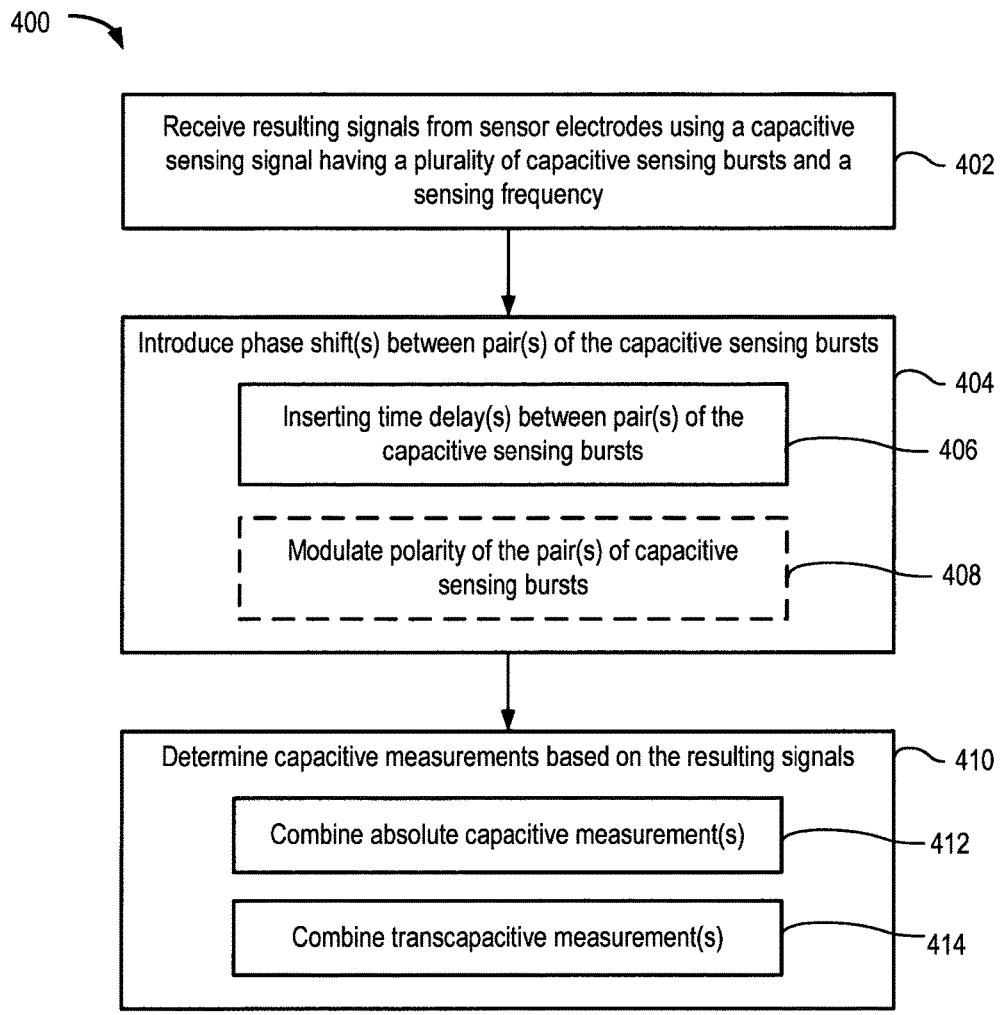
FIG. 4 is a flow diagram depicting a method of operating a capacitive sensing device having a plurality of sensor electrodes according to an embodiment.

FIG. 4 is a flow diagram depicting a method 400 of operating a capacitive sensing device having a plurality of sensor electrodes according to an embodiment. The method 400 can be performed by the processing system 110 in the input device 100 described above. The method 400 begins at operation 402, where the processing system 100 receives resulting signals from sensor electrodes using a capacitive sensing signal having a plurality of capacitive sensing bursts and a sensing frequency.

At operation 404, the processing system 110 introduces phase shift(s) between pair(s) of the capacitive sensing bursts. The operation 404 can include an operation 406, where the processing system 110 inserts time delay(s) between pair(s) of the capacitive sensing bursts. Alternatively, the operation 404 can include an operation 408, where the processing system 110 modulates polarity of the pair(s) of capacitive sensing bursts.

At operation 410, the processing system 110 determines capacitive measurements based on the resulting signals. The operation 410 can include an operation 412, where the processing system 110 combines absolute capacitive measurement(s) determined from the resulting signals. The operation 410 can include an operation 414, where the processing system 110 combines transcapacitive measurement(s) determined from the resulting signals.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. A processing system for a capacitive sensing device, comprising:
  a sensor module comprising sensor circuitry coupled to a first plurality of sensor electrodes, the sensor module configured to:
    receive resulting signals from the plurality of sensor electrodes using a capacitive sensing signal having a plurality of capacitive sensing bursts and a sensing frequency; and
    introduce at least one phase shift between a respective at least one pair of the plurality of capacitive sensing bursts; and
  a determination module configured to determine capacitive measurements based on the resulting signals;
  wherein the sensor module is configured to determine the at least one phase shift from an analytical metric quantifying susceptibility of the capacitive measurements versus interference frequency by minimizing a first function, the first function being variance of a second function over frequency, the second function being variance of the capacitive measurements over time.

2. The processing system of claim 1, wherein:
  the plurality of sensor electrodes comprise a first set of sensor electrodes disposed along a first axis;
  the sensor circuitry is coupled to a second set of sensor electrodes disposed along a second axis;
  the sensor module is configured to:
    receive additional resulting signals from the second set of sensor electrodes using a capacitive sensing signal having an additional plurality of capacitive sensing bursts and the sensing frequency; and
    introduce at least one phase shift between a respective at least one pair of the additional plurality of capacitive sensing bursts; and
  the determination module is configured to determine additional capacitive measurements based on the additional resulting signals.

3. The processing system of claim 2, wherein:
  the capacitive measurements comprise a combination of a plurality of absolute capacitive measurements along the first axis corresponding to the plurality of capacitive sensing bursts; and
  the additional capacitive measurements comprise a combination of a plurality of absolute capacitive measurements along the second axis corresponding to the additional plurality of capacitive sensing bursts.

4. The processing system of claim 1, wherein the plurality of capacitive sensing bursts comprises a sequence of at least three capacitive sensing bursts.

5. The processing system of claim 1, wherein the sensor module is configured to introduce the at least one phase delay by modulating polarity of the at least one pair of the plurality of capacitive sensing bursts.

6. The processing system of claim 1, wherein the sensor module is configured to introduce the at least one phase delay by inserting a time delay between the respective at least one pair of the plurality of capacitive sensing bursts.

7. The processing system of claim 1, wherein the capacitive measurements comprise a combination of a plurality of absolute capacitive measurements corresponding to the plurality of capacitive sensing bursts.

8. The processing system of claim 1, wherein the capacitive measurements comprise a combination of a plurality of transcapacitive measurements corresponding to the plurality of capacitive sensing bursts.

9. The processing system of claim 1, wherein:
  the plurality of sensor electrodes comprise a set of receiver electrodes;
  the sensor circuitry is coupled to a set of transmitter electrodes;
  the resulting signals comprise effects of the capacitive sensing signal emitted by at least one of the transmitter electrodes and at least one input object.

10. A method of operating a capacitive sensing device having a plurality of sensor electrodes, the method comprising:
  receiving resulting signals from the plurality of sensor electrodes using a capacitive sensing signal having a plurality of capacitive sensing bursts and a sensing frequency;
  introducing at least one phase shift between a respective at least one pair of the plurality of capacitive sensing bursts;
  determining capacitive measurements based on the resulting signals; and
  determining the at least one phase shift based on an analytical metric quantifying susceptibility of the capacitive measurements versus interference frequency by minimizing a first function, the first function being variance of a second function over frequency, the second function being variance of the capacitive measurements over time.

11. The method of claim 10, wherein the operation of introducing the at least one phase shift comprises inserting at least one time delay between the respective at least one pair of the plurality of capacitive sensing bursts.

12. The method of claim 11, wherein each of the at least one time delay is less than a cycle of the sensing frequency.

13. The method of claim 11, wherein each of the at least one time delay is greater than a cycle of the sensing frequency.

14. The method of claim 10, wherein the operation of introducing the at least one phase shift comprises modulating polarity of the at least one pair of the plurality of capacitive sensing bursts.

15. The method of claim 10, wherein the capacitive measurements comprise a combination of a plurality of absolute capacitive measurements corresponding to the plurality of capacitive sensing bursts.

16. The method of claim 10, wherein the capacitive measurements comprise a combination of a plurality of transcapacitive measurements corresponding to the plurality of capacitive sensing bursts.

17. An input device, comprising: a plurality of sensor electrodes; and
  a processing system, coupled to the plurality of sensor electrodes, the processing system configured to:

receive resulting signals from the plurality of sensor electrodes using a capacitive sensing signal having a plurality of capacitive sensing bursts and a sensing frequency;

introduce at least one phase shift between a respective at least one pair of the plurality of capacitive sensing bursts; determine capacitive measurements based on the resulting signals; and determine the at least one phase shift based on an analytical metric quantifying susceptibility of the capacitive measurements versus interference frequency by minimizing a first function, the first function being variance of a second function over frequency, the second function being variance of the capacitive measurements over time.

18. The input device of claim 17, wherein the processing system is configured to introduce the at least one phase delay by modulating polarity of the at least one pair of the plurality of capacitive sensing bursts.

19. The input device of claim 17, wherein the processing system is configured to introduce the at least one phase delay by inserting a time delay between the respective at least one pair of the plurality of capacitive sensing bursts.

* * * * *